(12) United States Patent
Aoki et al.

(10) Patent No.: US 7,196,858 B2
(45) Date of Patent: Mar. 27, 2007

(54) COLLAPSIBLE LENS BARREL AND IMAGING APPARATUS

(75) Inventors: Nobuaki Aoki, Tokyo (JP); Atsuya Ishii, Kanagawa (JP)

(73) Assignee: Sony Corporation (JP)

( * ) Notice: Subject to any disclaimer, the term of this patent is extended or adjusted under 35 U.S.C. 154(b) by 168 days.

(21) Appl. No.: 11/100,579

(22) Filed: Apr. 7, 2005

(65) Prior Publication Data

US 2005/0231832 A1 Oct. 20, 2005

(30) Foreign Application Priority Data

Apr. 19, 2004 (JP) ............................ P2004-123173

(51) Int. Cl.
*G02B 7/02* (2006.01)
*G02B 15/14* (2006.01)
(52) U.S. Cl. ...................... 359/826; 359/822; 359/823; 359/694; 359/699
(58) Field of Classification Search ................ 359/826, 359/822, 823, 819, 813, 814, 694–699
See application file for complete search history.

(56) References Cited

U.S. PATENT DOCUMENTS

| 5,319,498 A | 6/1994 | Hara et al. |
| 2002/0044363 A1 | 4/2002 | Takeshita et al. |

2003/0219249 A1 11/2003 Tanaka et al.

FOREIGN PATENT DOCUMENTS

| JP | 2002-286988 | 10/2002 |
| JP | 2004-194645 | 7/2004 |
| JP | 2005-148263 | 6/2005 |

OTHER PUBLICATIONS

European Search Report; Application No.: 05290865.4-2217; dated Dec. 6, 2006.

*Primary Examiner*—Ricky Mack
*Assistant Examiner*—Brandi Thomas
(74) *Attorney, Agent, or Firm*—Rader Fishman & Grauer PLLC; Ronald P. Kananen

(57) ABSTRACT

There is provided a collapsible lens barrel including plural barrels of different outside diameters from one another and enabled to move coaxially and perform relative movement in an axial direction, and an image-capturing optical system disposed within the plural barrels; wherein the image-capturing optical system includes at least two lens holding frames arranged in a direction of an optical axis of the image-capturing optical system; and, considering an object side is set as a front side and an opposite side is set as a rear side, each of a rearmost lens holding frame, placed at a rearmost position, and one of the lens holding frames placed immediately in front of the rearmost lens holding frame, are respectively movably supported by a corresponding guide mechanism to move in the direction of the optical axis and to move in the direction of the optical axis by a corresponding drive mechanism.

10 Claims, 13 Drawing Sheets

COLLAPSIBLE LENS BARREL AND IMAGING APPARATUS

CROSS REFERENCE TO RELATED APPLICATIONS

The present invention contains subject matter related to Japanese Patent Application JP2004-123173, filed in the Japanese Patent Office on Apr. 19, 2004, the contents of which are incorporated herein by reference.

BACKGROUND OF THE INVENTION

1. Field of the Invention

The present invention relates to a collapsible lens barrel and to an imaging apparatus.

2. Description of Related Art

A collapsible lens barrel, which incorporates an image-capturing optical system, which is adapted to collapse and/or expand in an axial direction along the optical axis thereof, and which is used as a lens barrel for an imaging apparatus, such as a digital still camera and a digital video camera, for example, is available.

Such a collapsible lens barrel has plural lens holding frames, which are disposed at places in front of an imaging device for electronically imaging an object, which optical image is formed by the image-capturing optical system, in such a way as to move along the direction of the optical axis thereof, and also has plural drive mechanisms for moving each of the lens holding frames in the direction of the optical axis thereof.

For the drive mechanisms, there have been proposed mechanisms, each having a male screw member extending in the direction of the optical axis, a motor for rotation-driving the male screw member, and a female screw member screwed in to the male screw member and moved in the extending direction of the male screw member and adapted so that this female member is connected to the lens holding frame, and the lens holding frame is moved, together with the female screw member, in the direction of the optical axis by rotation of the motor (see, for example, Japanese Patent Application Laid-Open No. 2002-286988 Official Gazette).

In such a collapsible lens barrel, each of the lens holding frames is moved to a rear end position, which is located at the rearmost place in the direction of the optical axis, in a collapsed condition. At that time, to prevent each of the lens holding frames and the drive mechanisms therefor from being damaged, clearances should be ensured between the lens holding frames and between the lens holding frame, which is positioned at the rearmost place, and a component provided at the rear end of the barrel.

On the other hand, there has been proposed a collapsible lens barrel in which an abutting member is provided at the frontmost position of the plural lens holding frames arranged in the direction of the optical axis in such a way as to be able to move in the direction of the optical axis, and in which a compression coil spring is disposed between the rear end of the abutting member and the adjacent lens holding frame (see, for example, Japanese Patent Application Laid-Open No. 2002-383449 Official Gazette).

Such a collapsible lens barrel is adapted so that in the collapsed condition, each of the lens holding frames is retreated through the compression coil spring by backwardly moving the abutting member, so that the plural lens holding frames are made to abut against each other, and so that the lens holding frame provided to the rearmost position is made to abut against the rear end of the lens barrel.

SUMMARY OF THE INVENTION

In the former collapsible lens barrel, a clearance should be ensured between adjacent plural lens holding frames. Thus, the former collapsible lens barrel presents some issues when considering miniaturization of the barrel in the collapsed condition.

The latter collapsible lens barrel needs specific components, such as an abutting member and a compression coil spring, which, therefore, increase the cost of the components. In addition, space is required in which the abutting member and the compression coil spring are disposed. Consequently, the latter collapsible lens barrel also presents issues when pursuing miniaturization of the barrel in the collapsed condition.

The present invention has been conceived in view of such circumstances. A preferred embodiment of the present invention provides a lens barrel and an imaging apparatus, which are advantageous for miniaturization of the barrel in the collapsed condition without requiring exclusive components therein.

According to a preferred embodiment of the present invention, it is preferable to provide a collapsible lens barrel including plural barrels of different outside diameters from one another and enabled to move coaxially and perform relative movement in an axial direction, and an image-capturing optical system disposed within the plural barrels; wherein the image-capturing optical system includes at least two lens holding frames arranged in a direction of an optical axis of the image-capturing optical system; and, considering an object side is set as a front side and an opposite side is set as a rear side, each of a rearmost lens holding frame, placed at a rearmost position, and one of the lens holding frames placed immediately in front of the rearmost lens holding frame, are respectively movably supported by a corresponding guide mechanism to move in the direction of the optical axis and to move in the direction of the optical axis by a corresponding drive mechanism, the collapsible lens barrel having a drive mechanism for moving the rearmost lens holding frame in the direction of the optical axis and including a moving piece driven by a motor to move rectilinearly along the direction of the optical axis; wherein: the rearmost lens holding frame is pushed forwardly by a coil spring; an engaging piece provided in the rearmost lens holding frame is abutted against the moving piece from behind the moving piece and follows a rectilinear movement of the moving piece so as to move the rearmost lens holding frame in the direction of the optical axis; the rearmost lens holding frame is moved by the corresponding drive mechanism to a rear end position, which is located most backwardly, in a collapsed status in which the total length of the plural barrels is minimum; and the lens holding frame placed immediately in front of the rearmost lens holding frame is backwardly moved by the corresponding drive mechanism and abuts against the rearmost lens holding frame placed at the rear end position, to then move backwardly together with the rearmost lens holding frame to a rear end place at which the moving piece is separated from the engaging piece.

Also, according to another preferred embodiment of the present invention, there is provided an imaging apparatus including plural barrels of different outside diameters from one another and enabled to move coaxially and perform relative movement in an axial direction, and an image-capturing optical system disposed within the plural barrels; wherein the image-capturing optical system includes at least two lens holding frames arranged in a direction of an optical axis of the image-capturing optical system; and, considering an object side is set as a front side and an opposite side is set as a rear side, each of a rearmost lens holding frame, placed at a rearmost position, and one of the lens holding frames placed immediately in front of the rearmost lens holding frame, are respectively movably supported by a corresponding guide mechanism to move in the direction of the optical axis and to move in the direction of the optical axis by a corresponding drive mechanism, the imaging apparatus comprising:

a drive mechanism for moving the rearmost lens holding frame in the direction of the optical axis and including a moving piece driven by a motor to move rectilinearly along the direction of the optical axis; wherein:

the rearmost lens holding frame is pushed forwardly by a coil spring;

an engaging piece provided in the rearmost lens holding frame is abutted against the moving piece from behind the moving piece and follows a rectilinear movement of the moving piece so as to move the rearmost lens holding frame in the direction of the optical axis;

the rearmost lens holding frame is moved by the corresponding drive mechanism to a rear end position, which is located most backwardly, in a collapsed status in which the total length of the plural barrels is minimum; and the lens holding frame placed immediately in front of the rearmost lens holding frame is backwardly moved by the corresponding drive mechanism and abuts against the rearmost lens holding frame placed at the rear end position, to then move backwardly together with the rearmost lens holding frame to a rear end place at which the moving piece is separated from the engaging piece.

According to the preferred embodiments of the present invention, in the collapsed condition of the barrel, the rearmost lens holding frame may be made to abut against the lens holding frame placed immediately in front of the rearmost one. Thus, there is no need for ensuring a clearance between these two lens holding frames. Consequently, the dimension in the direction of the optical axis of the barrel in the collapsed condition may be reduced.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

An attempt at miniaturizing the barrel in the collapsed condition without requiring exclusive components is achieved by causing the rearmost lens holding frame to abut against the lens holding frame placed immediately in front of the rearmost one.

Next, an example of a preferred embodiment of the present invention is described hereinbelow by referring to the accompanying drawings.

Figure 1:
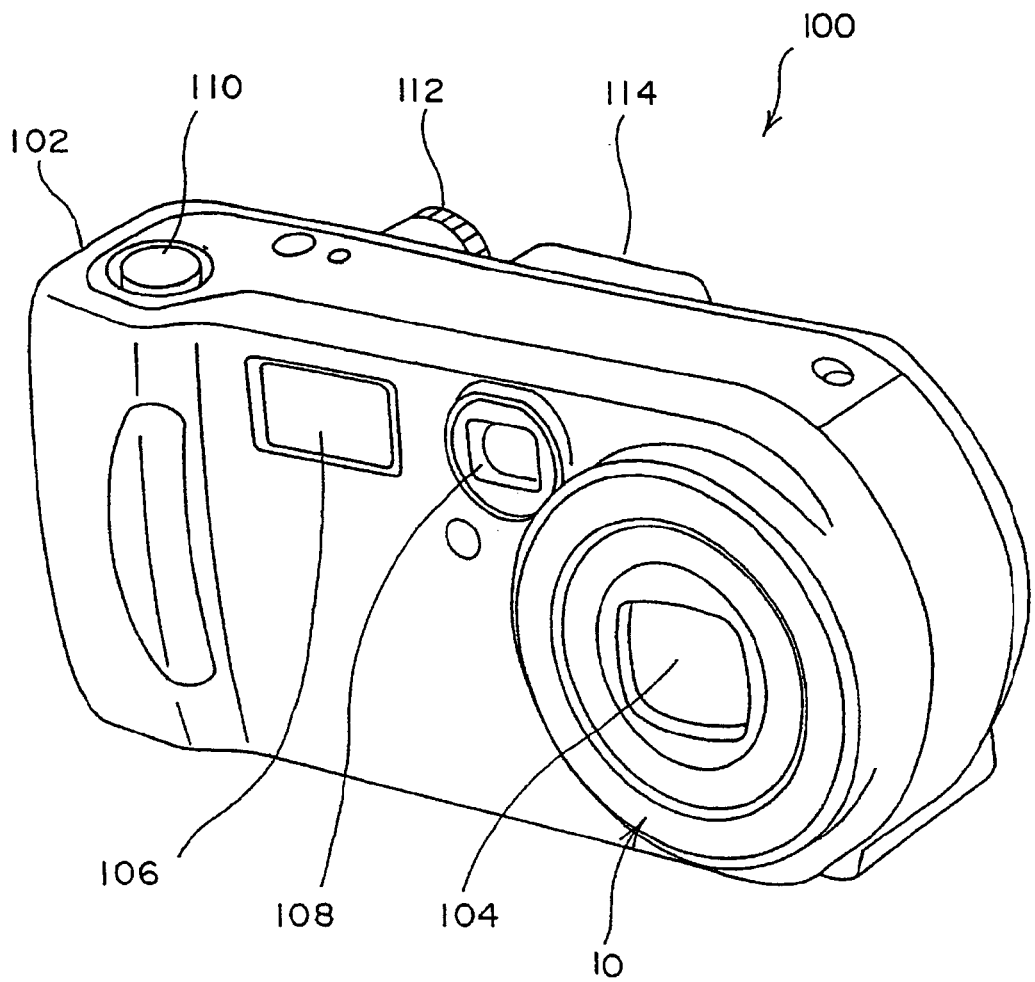
FIG. 1 is a perspective view of an imaging apparatus as a first example of preferred embodiment of the present invention.
Figure 2:
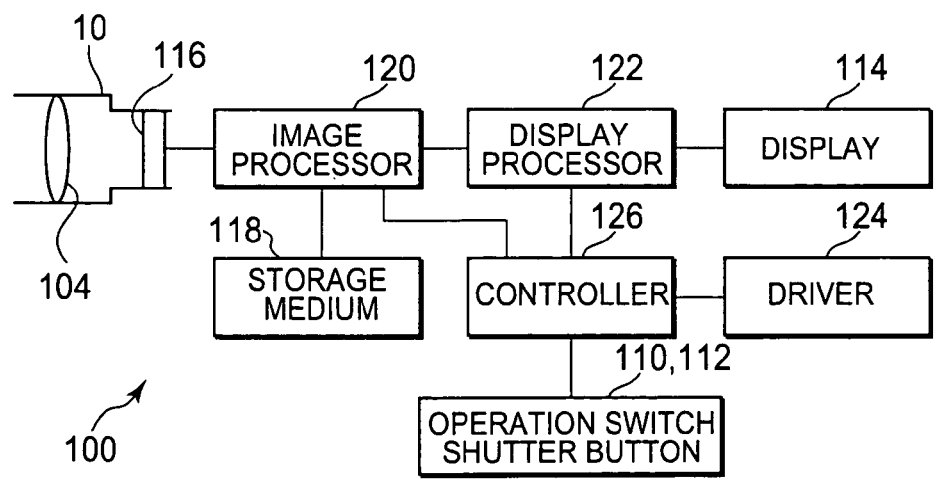
FIG. 2 is a block view illustrating the configuration of the imaging apparatus as a First example of preferred embodiment of the present invention.

FIG. 1 is a perspective view of an imaging apparatus according to the example of the preferred embodiment of the present invention. FIG. 2 is a block view illustrating the configuration of the imaging apparatus according to the example of the preferred embodiment of the present invention.

As shown in FIG. 1, the imaging apparatus 100, which constitutes this example of the preferred embodiment, is a digital still camera having a case 102, which constitutes an outer cover or body thereof.

A collapsible lens barrel 10 for accommodating and holding an image-capturing optical system 104 is provided at a location to the right side of the front face of the case 102. A flash section 106 and an objective lens 108 of an optical finder 40 are provided at a location to the top of the front face of the case 102 (see FIGS. 3(A) and 3(B)).

The lens barrel 10 is configured in such a way as to be moved by a drive section 124 (see FIG. 2), which is incorporated in the case 102, between a use position (corresponding to a wide-angle condition, a telescopic condition, and an intermediate condition between the wide-angle condition and the telescopic condition) projecting frontwardly from the front face of the case 102 and an accommodation position (corresponding to a collapsed condition), at which the lens barrel 10 is accommodated in the front face of the case 102.

A shutter button 110 is provided on the top face of the case 102. An eyepiece window (not shown) of the optical finder, plural operation switches 112 for performing various operations, such as on/off of a power supply and changeover between a photographing mode and a reproducing mode, and a display 114 (see FIG. 2) for displaying a photographed image are provided on the rear face of the case 102.

As shown in FIG. 2, an imaging device 116, which is constituted by a CCD and a CMOS sensor, for electronically imaging an object, whose optical image is formed by the image-capturing optical system 104, is disposed in the rear portion of the lens barrel 10. The imaging apparatus 100 has an image processor 120 for generating image data according to imaging signals outputted from the imaging device 116 and recording the image data in a storage medium 118, and it also has a display processor 122 for displaying the image data in a display 114, a driver 124, and a controller 126 that includes a CPU for controlling the image processor 120, the display processor 122 and a driver 124 in response to operations performed on the operating switch 112 and the shutter button 110.

Next, the outline of the configuration of the lens barrel 10 is described hereinbelow.

Figure 3A:
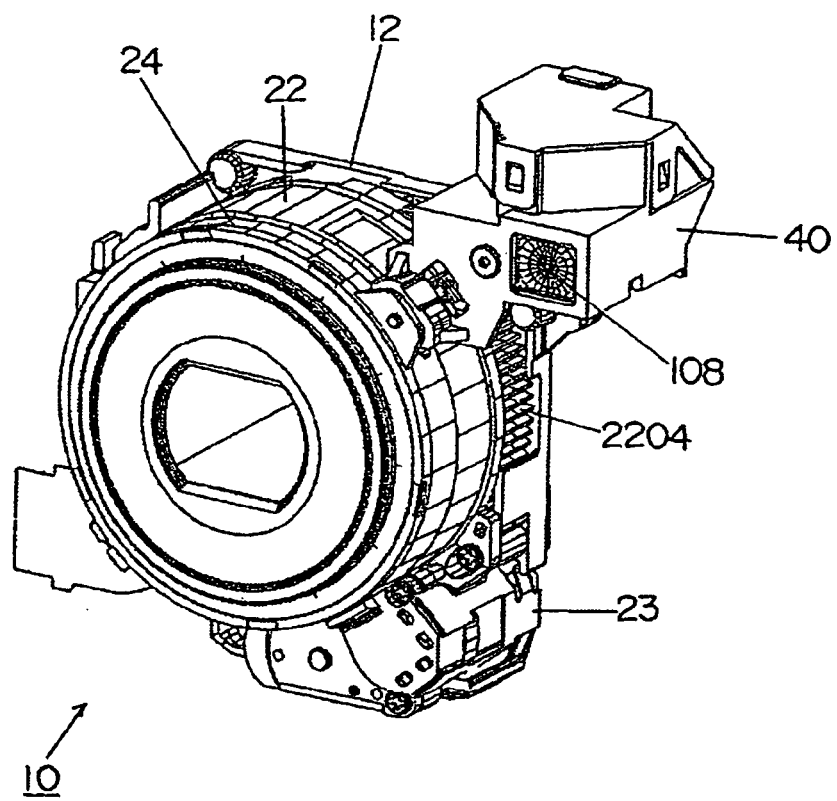
FIGS. 3(A) and 3(B) are perspective views illustrating the conditions of a lens barrel 10.
Figure 3B:
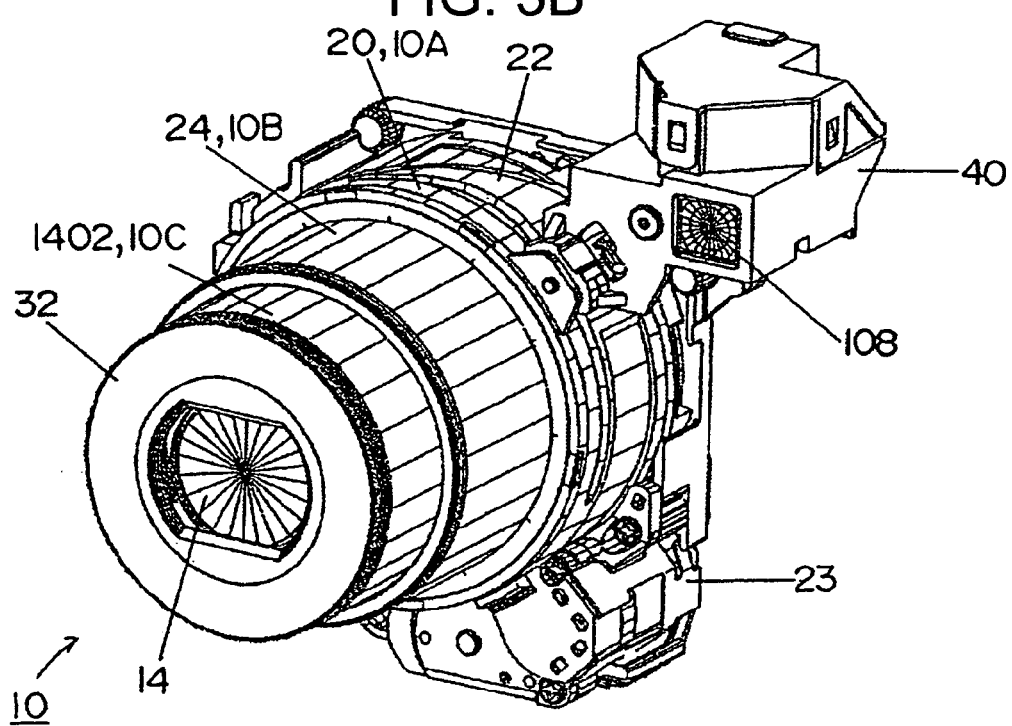
Figure 4A:
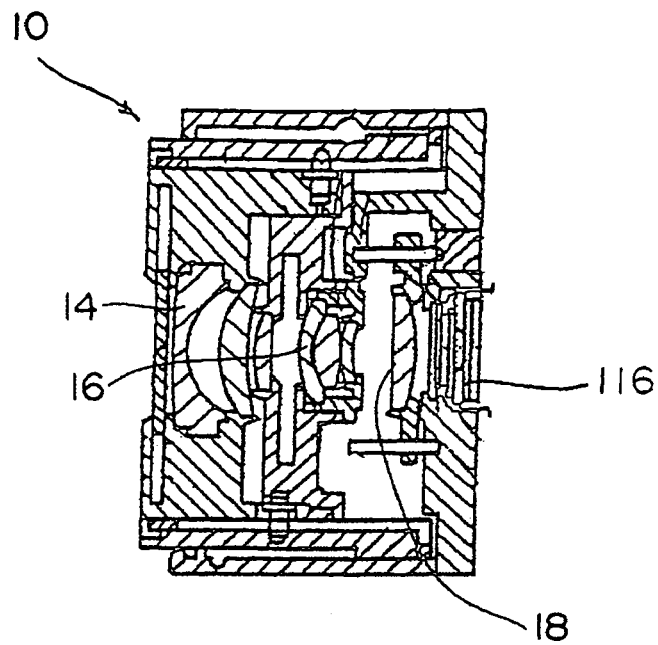
FIGS. 4(A) to 4(C) are cross-sectional views illustrating the conditions of the lens barrel 10.
Figure 4B:
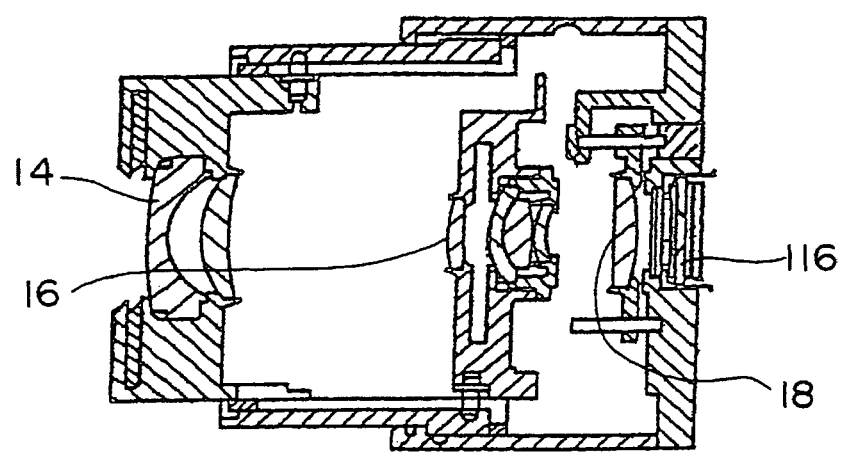
Figure 4C:
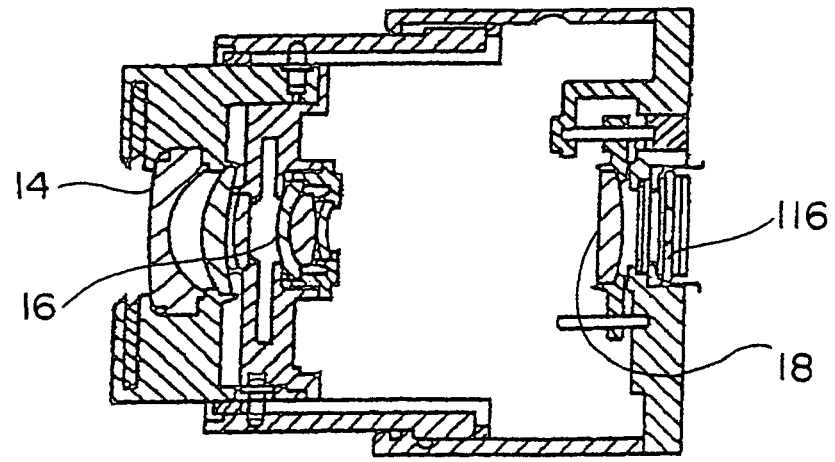
Figure 5:
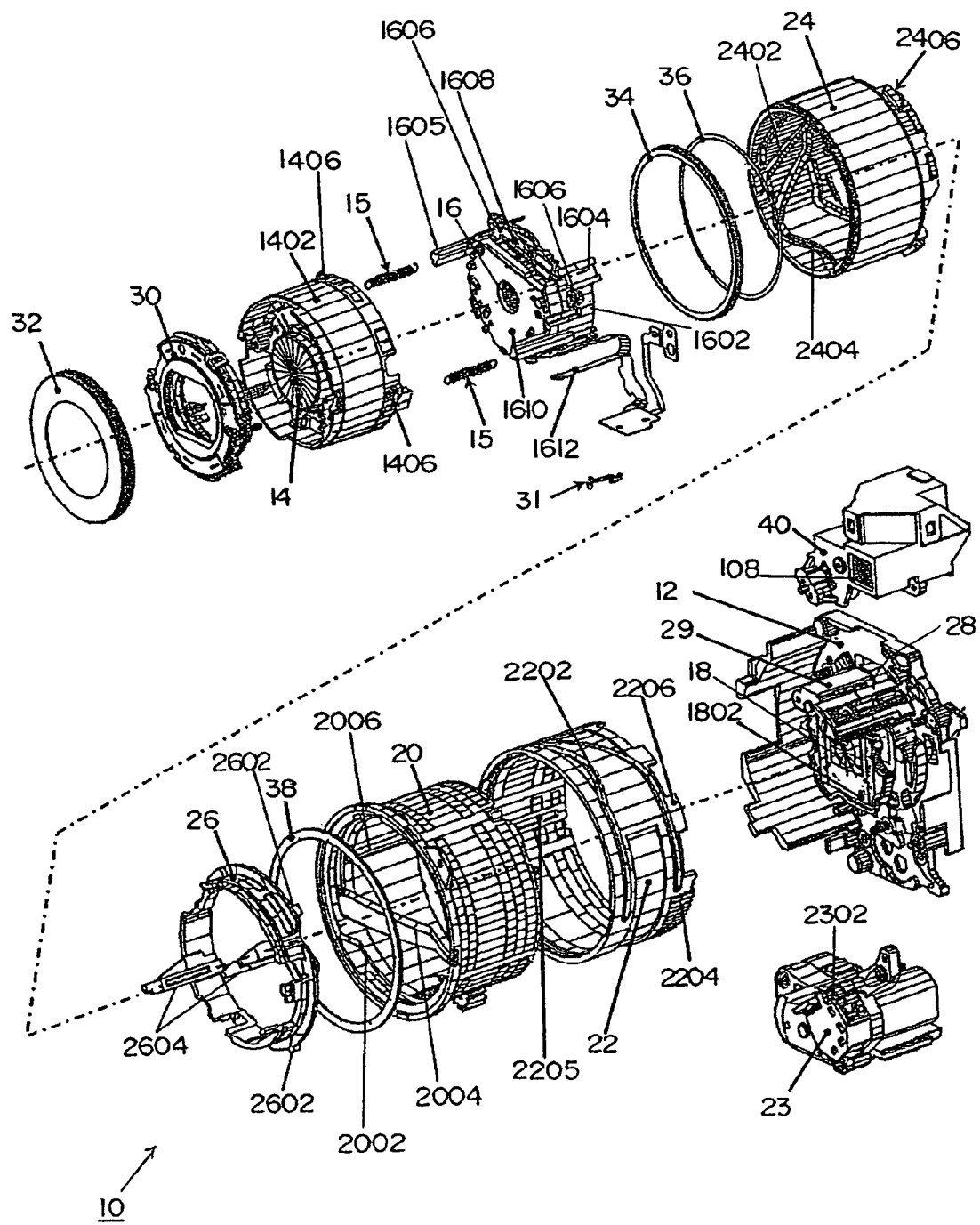
FIG. 5 is an exploded perspective view illustrating a collapsible lens.

FIGS. 3(A) and 3(B) are perspective views, each illustrating the condition of the lens barrel. FIG. 3(A) shows a lens accommodated condition, in other words, a collapsed condition in which the lens is not in use. FIG. 3(B) shows a lens projected condition (in other words, the wide-angle condition or the telescopic condition) in which the lens is used. FIGS. 4(A) to 4(C) are cross-sectional views of the lens barrel 10. FIG. 4(A) shows the collapsed condition thereof. FIG. 4(B) shows the wide-angle condition thereof. FIG. 4(C) shows the telescopic condition thereof. FIG. 5 is an exploded perspective view illustrating the lens barrel 10.

As shown in FIGS. 3(A) and 3(B), the lens barrel 10 is attached to a base 12, in other words fixed to the case 102.

As shown in FIGS. 4(A) to 4(C), the lens barrel 10 optically has a three-group configuration. In other words, assuming that an object side in the direction of an optical axis of the lens barrel 10 is a front side and the side of the imaging device 116 in the direction of an optical axis thereof is a rear side, three groups constituting the lens barrel 10 include a first group lens 14, a second group lens 16, and a third group lens 18 disposed in this order from the front side to the rear side.

The first group lens 14 and the second group lens 16 of the lens barrel 10 are driven in the direction of the optical axis thereof along a predetermined camcurve to thereby perform zooming (in other words, focal length adjustment). The third group lens 18 of the lens barrel 10 is minutely displaced in the direction of the optical axis thereof to thereby perform focusing (in other words, focus adjustment). In other words, the lens barrel is configured so that the displacement of each of the first group lens 14 and the second group lens 16 enables the change of a focal length, and a deviation of a focusing position, which is caused by this change of the focal length, is corrected by the displacement of the third group lens 18 to thereby suitably achieve focusing.

As shown in FIG. 5, in the lens barrel 10, a fixed ring 20, a rotating ring 22, a cam ring 24, and a rectilinear guide ring 26 are used as constituents for moving the first group lens 14 and the second group lens 16 in the direction of the optical axis thereof. A guide mechanism 28 and a drive mechanism 29 are used as constituents for moving the third group lens 18 in the direction of the optical axis thereof.

As shown in FIG. 3(B), the lens barrel 10 is of the collapsible type that comprises a first barrel 10A, a second barrel 10B, and a third barrel 10C, which differ in outside diameter from one another, and performs relative movement in an axial direction. The first barrel 10A is constituted by a fixed ring 20, in other words disposed in the case 102. The second barrel 10B is constituted by a cam ring 24, in other words disposed inside the fixed ring 20. The third barrel 10C is constituted by the first group lens holding frame 1402, in other words disposed inside the cam ring 24. Incidentally, the lens barrel is constituted by the first group lens 14, the second group lens 16, the third group lens 18, and the drive systems therefor disposed in this barrel 10.

Figure 6:
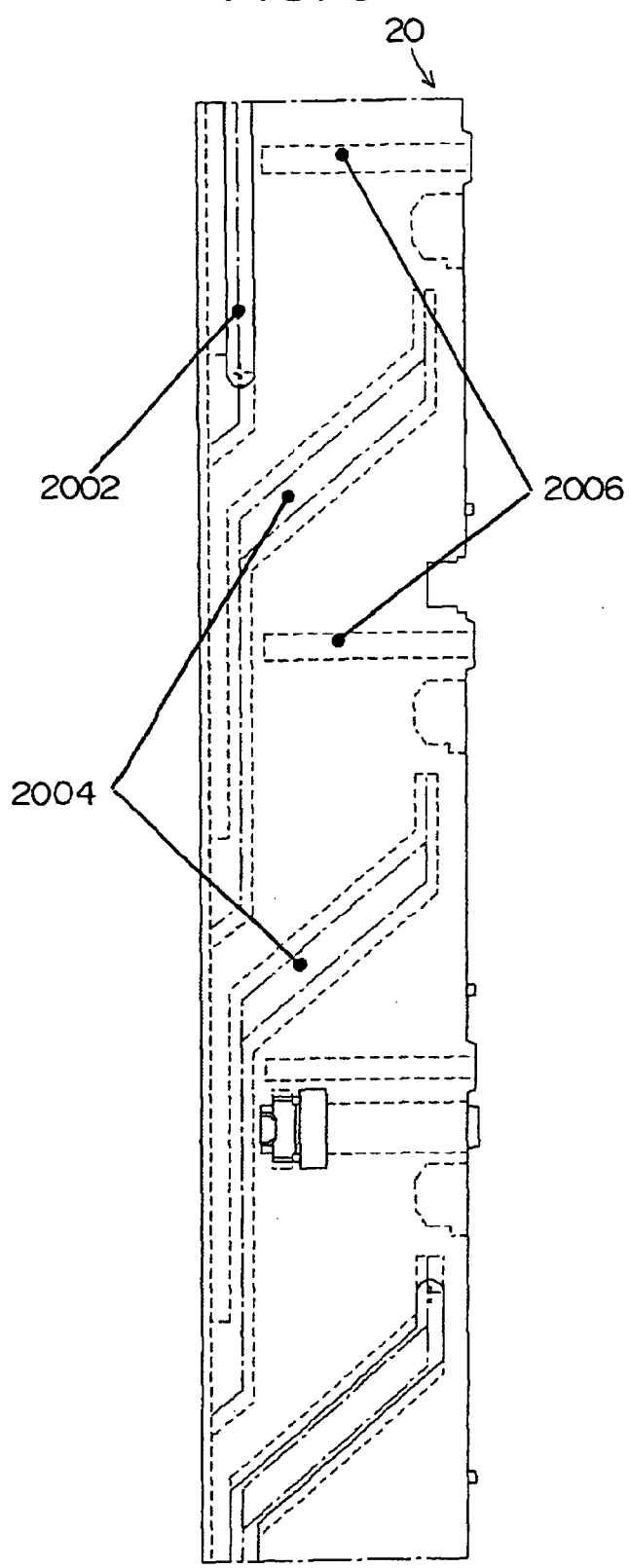
FIG. 6 is a development view of a fixed ring 20.

More specifically, the fixed ring 20 is fixed to the base 12. As shown in FIG. 6, cam grooves 2002 and 2004, which circumferentially extend, and a rectilinear guide groove 2006 extending in parallel with the direction of the optical axis of the image-capturing optical system are provided in an inner peripheral surface of the fixed ring 20.

The rotating ring 22 is rotatably provided on an outer periphery of the fixed ring 20 in such a way as to be unable to move in the direction of the optical axis.

Plural cam grooves 2202 penetrating the inner peripheral surface and the outer peripheral surface of the rotating ring 22 and extending in the direction of the circumference thereof are provided therein. A rectilinear groove 2205 rectilinearly extending along the direction of the optical axis is provided in the inner peripheral surface of the rotating ring 22. A gear section 2204 is formed in a rear portion of the outer peripheral surface of the rotating ring 22 in such a way as to have a predetermined length in the circumferential direction thereof. Plural fins 2206 for detecting a rotational position are provided on the rear end of the rotating ring 22 in such a manner as to project therefrom.

A gear section 2204 is meshed with a gear 2302 of a rotating ring drive mechanism 23 attached to the base 12. A rotation driving force fed from the rotating ring drive mechanism 232 is supplied to the rotating ring 22 through a gear 2302 and a gear section 2204, so that the rotating ring 22 is driven in such a way as to rotate around the optical axis thereof.

The rotating ring drive mechanism 23 has a DC motor for rotation-driving the gear 2302, a rotary encoder for counting the number of revolutions of this DC motor or the gear 2302, and a photo sensor for detecting the movement of the fins 2206. The rotational speed and the rotational position of the rotating ring 22 are controlled according to detection signals of the rotary encoder and the photo sensor.

The third group lens 18 is held by a third group lens holding frame 1802 that is disposed on the base 12 in such a way so as to move in the direction of the optical axis thereof and to be unable to rotate around the optical axis thereof. The third group lens moving mechanism 28 has a male screw member (or lead screw) to be screwed to a female screw member connected to the third group lens holding frame 1802, and it also has a motor for rotation-driving the third group lens 18 in the direction of the optical axis. This motor is rotation-driven to thereby move the third group lens 18 in the direction of the optical axis, so that a focusing operation is performed.

Figure 7:
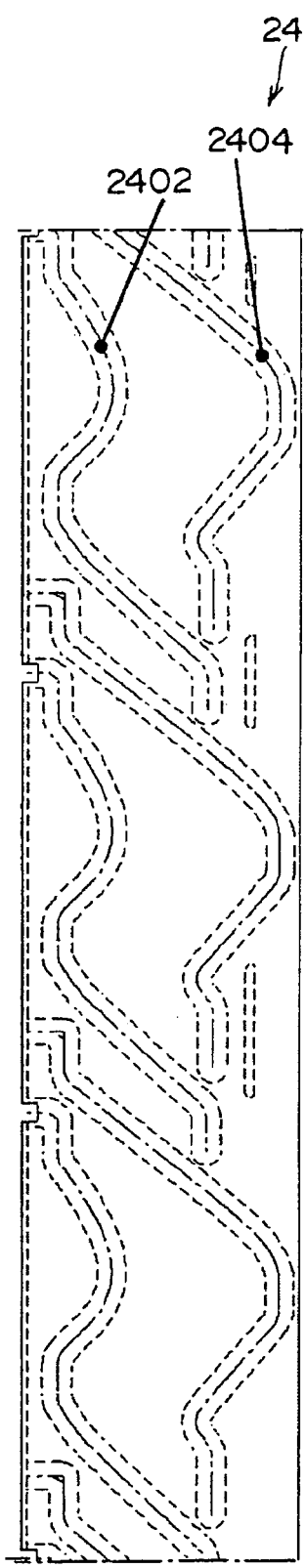
FIG. 7 is a development view of a cam ring 24.

As shown in FIG. 5, a cam ring 24 is provided in a radially inner portion of the fixed ring 20 in such a way as to rotate and move in the direction of the optical axis thereof. Cam grooves 2402 and 2404 are provided in the inner peripheral surface of the cam ring 24, as shown in FIG. 7. Three protruding sections 2406 projecting radially and outwardly are provided on the rear end of the cam ring 24 in such a way as to be spaced in the circumferential direction thereof, as shown in FIG. 5. Further, during a state in which these three protruding sections 2406 engage with the cam grooves 2002 and 2004 of the fixed ring 20, the cam ring 24 performs rotational motions with respect to the fixed ring 20, so that these three protruding sections 2406 are moved along the cam grooves 2002 and 2004. Consequently, the cam ring 24 is moved in the direction of the optical axis thereof.

Furthermore, at least one of the cam grooves 2002 of the fixed ring 20 penetrates therethrough. An end of an arm (not shown) provided on the protruding portion 2406 of the cam ring 24, which corresponds to the cam groove 2002 penetrating therethrough, engages with the rectilinear groove 2205 of the rotating ring 22 through the cam grooves 2002. Consequently, the cam ring 24 and the rotating ring 22 are connected to each other and rotate with respect to the fixed ring 20. In other words, when the rotating ring 22 is rotated, the cam ring 24 moves in the direction of the optical axis while rotating.

The rectilinear guide ring 26 is provided in the radially inner portion of the cam ring 24 in such a manner so as to be unable to rotate and to move in the direction of the optical axis by being connected to the cam ring 24. Particularly, three protruding sections 2602 projecting radially and outwardly are provided on the rear end of the rectilinear guide ring 26 are provided by being spaced in the circumferential direction. Further, in a state in which these three protruding sections 2602 extend through the rear of the cam ring 24 and engage with the rectilinear guide grooves 2008 of the fixed ring 20, the cam ring 24 performs rotational motions with respect to the fixed ring 20. Thus, these three protruding sections 2602 are moved along the rectilinear guide groove 2006 of the fixed ring 20. Consequently, the guide ring 26 is linked with the cam ring 24 and moved only in the direction of the optical axis without rotating.

Further, guide pieces 2604 are provided on the rectilinear guide ring 26 in such a way as to be respectively projected frontward from two places located across a radial direction of the front edge thereof in parallel to the direction of the optical axis.

The second group lens 16 is held by the second group lens holding frame 1602. The second group lens 16 is disposed on the inner periphery of the cam ring 24. Guide sections 16 positioned at two places, which are located across a radial direction, in such a way so as to extend in parallel to the direction of the optical axis and to be guided by two guide pieces 2604 of the rectilinear guide ring 26, guide rails 1605 positioned at two places, which are located across a radial direction, in such a manner so as to extend in parallel to the direction of the optical axis and to frontward project, and three cam pins 1606 engaged with the cam grooves 2404 of the cam ring 24 are provided on the outer peripheral surface of the second group lens holding frame 1602.

Further, in a state in which the guide sections 1604 are guided by the guide pieces 2604 and in which the three cam pins 1606 are engaged with the cam grooves 2404 of the cam ring 24, the cam ring 24 rotates, so that the second group lens 16 (or the second group lens holding frame 1602) is moved along the camcurves set in the cam grooves 2404 only in the direction of the optical axis without rotating.

Therefore, in this example of the preferred embodiment, the guide mechanism for holding the second group lens holding frame 1602 is constituted by the guide pieces 2604 and the guide section 1604. The guide mechanism for moving the second group lens holding frame 1602 is constituted by the rotating ring drive mechanism 23, the rotating ring 22, the cam ring 24, the cam groove 2404, and the cam pin 1606.

The second group lens holding frame 1602 is provided with a second group light shielding plate 1608 for shielding stray light in the lens barrel 10 and for preventing stray light from entering the imaging device 116.

The second group light shielding plate 1608 is attached to the second group lens holding frame 1602 in such a way as to swing around an axis line extending in a direction parallel to a plane perpendicular to the optical axis.

In a condition in which the lens barrel 10 is projected, the second group light shielding plate 1608 is placed at a shielding position for shielding light, by being pushed by a pushing member (not shown) in such a way as to abut against a stopper (not shown) provided on the second group lens holding frame 1602. In a process in which the condition of the lens barrel 10 is changed from the projected condition to the accommodated condition, the second group light shielding plate 1608 is made to abut against the front portion of the third group lens moving mechanism 28. Thus, the second group light shielding plate 1608 is swung from the shielding position and retreated from the front portion of the third group lens moving mechanism 28. Consequently, the second group light shielding plate 1608 and the second group lens holding frame 1602 can be placed nearer to the vicinity of the base 12. This is advantageous in reducing the space in the direction of the optical axis, which is occupied by the second group lens holding frame 1602, in the accommodated condition of the lens barrel 10.

Further, an automatic exposure device 1610 having the function of a shutter and the function of an adjustable diaphragm is provided at the front portion of the second group lens holding frame 1602. An end of a flexible wiring board 1612 made of a flexible material is connected to the automatic exposure device 1610. An intermediate section of this flexible wiring board 1612 is led from the rear end of the cam ring 24 to the outside of the fixed ring 20 through an opening (not shown) provided in the fixed ring 20. The other end of the flexible wiring board 1612 is fixed to the fixed ring 20 and the base 12. The flexible wiring board 1612 is formed in such a manner so as not to strain the wiring groups while a bent portion thereof continuously changes during a rotational operation of the rotating ring 22 and the movement in the direction of the optical axis of each of the second group lens holding frame 1602 and the rectilinear guide ring 26.

This flexible wiring board 1612 has a wiring group for supplying electrical signals that are used for causing an actuator group provided in the automatic exposure device 1610. Further, the flexible wiring board 1612 has another wiring group functioning as a flow path for instantaneous large current flowing when static electricity is applied to a portion of the barrel 10, which is exposed to the outside from the case 102. A connecting terminal of the latter wiring group of the flexible wiring board 1612, which is placed at the side of the base 12, is electrically connected to a grounded portion having an electric potential equal to that of the case 102.

The first group lens 14 is held by the first group lens holding frame 1402. The first group lens holding frame 1402 is disposed in the inner periphery of the cam ring 24 and in front of the second group lens holding frame 1602. The inner peripheral surface of the first group lens holding frame 1602 is provided with guide grooves (not shown) formed in two places, which are located across a radial direction, in such a way so as to extend in parallel to the direction of the optical axis and to be guided by two guide rails 1605 of the second group lens holding frame 1602, and with three cam pins 1406 engaged with the cam grooves 2404 of the cam rig 24.

Further, in a state in which the guide grooves are guided by the guide rails 1605 and in which the three cam pins 1406 are engaged with the cam grooves 2402 of the cam ring 24, the cam ring 24 rotates, so that the first group lens 14 (thus, the first group lens holding frame 1402) is moved only in the direction of the optical axis along the cam curve set in the cam groove 2402 without rotating.

Therefore, in this example of the preferred embodiment, the guide mechanism for supporting the first group lens holding frame 1402 in such a way as to move in the direction of the optical axis is constituted by the guide rails 1605 and the guide grooves. The drive mechanism for moving the first group lens holding frame 1402 in the direction of the optical axis is constituted by the rotating ring drive mechanism 23, the rotating ring 22, the cam ring 24, the cam groove 2402, and the cam pin 1405.

Also, two metallic coil springs 15 are provided in a stretched condition between the first group lens holding frame 1402 and the second group lens holding frame 1602. The first group lens frame 1402 and the second group lens frame 1602 are pushed by the pushing forces of these coil springs 15 in a direction in which the first group lens frame 1402 and the second group lens frame 1602 come close to each other. Consequently, the backlash between the cam pin 1406 and the cam groove 2402 and that between the cam pin 1606 and the cam groove 2404 are absorbed.

Further, a conducting plate 31 is incorporated into the second lens holding frame 1602. An end portion of one of the two coil springs 15 is locked in this conducting plate 31. Moreover, among the connecting terminals of the latter wiring group of the flexible wiring board 1612, the connecting terminal placed at the side of the first group lens holding frame 1402 is electrically connected to this conducting plate 31. Consequently, one of the coil springs 15 is connected to the grounded portion through the conducting plate 31 and the latter wiring group of the flexible wiring board 1612.

Further, a barrier mechanism 30 for opening and closing an optical path of the image-capturing optical system is provided at the front portion of the first group lens 14. A metallic decorative ring 32 for arranging the appearance of the lens barrel 10 is attached to the front portion of the first group lens holding frame 14. A metallic decorative ring 34 for arranging the appearance of the lens barrel is attached to the front portion of the cam ring 24.

A light shielding ring 36 for preventing dust and stray light from entering the gap between the outer periphery of the first group lens holding frame 14 and the inner periphery of the cam ring 24 is disposed in the gap therebetween. This light shielding ring 36 is attached onto the first group lens holding frame 14 and disposed in a state in which a clearance is provided between the decorative ring 34 and the cam ring 24.

A light shielding ring 38 for preventing dust and stray light from entering the gap between the outer periphery of cam ring 24 and the inner periphery of the fixed ring 20 is disposed in the gap therebetween. This light shielding ring 38 is attached to the outer periphery of the cam 24 and brought into elastic contact with the inner periphery of the fixed ring 20.

Further, the optical finder 40 incorporates a movable lens and is attached to the base 12. The movable lens is connected to the cam groove 2202 of the rotating ring 22 through a cam pin (not shown). The movable lens moves in conjunction with the rotating ring 22 in the direction of the optical axis, so that an operation of zooming the visual field is performed.

Next, the configuration of each of the third lens holding frame, the guide mechanism 28, and the drive mechanism 29 is described hereinbelow in detail.

Figure 8:
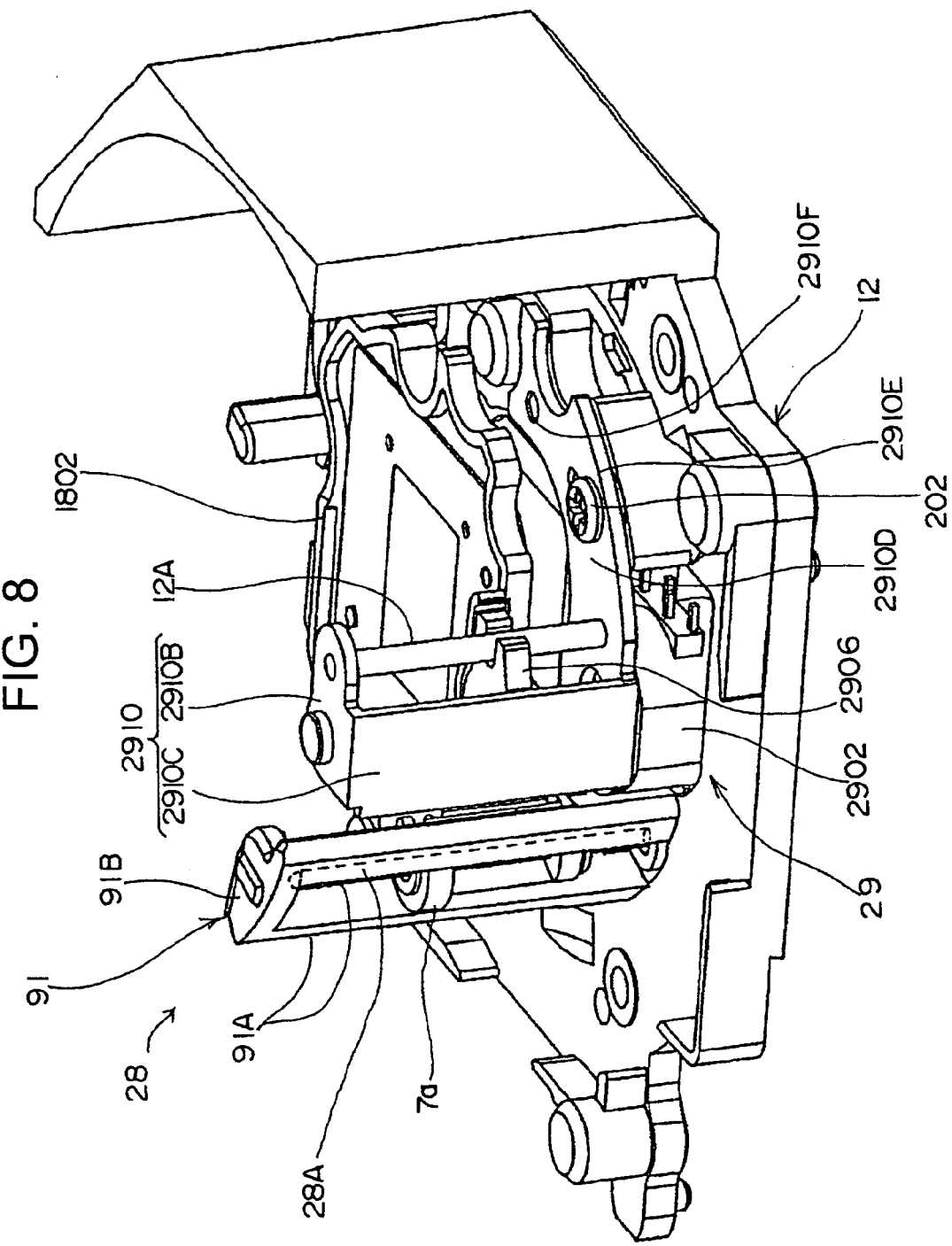
FIG. 8 is a perspective view illustrating the configuration of each of a third group lens holding frame 1802 and a base 12.
Figure 9:
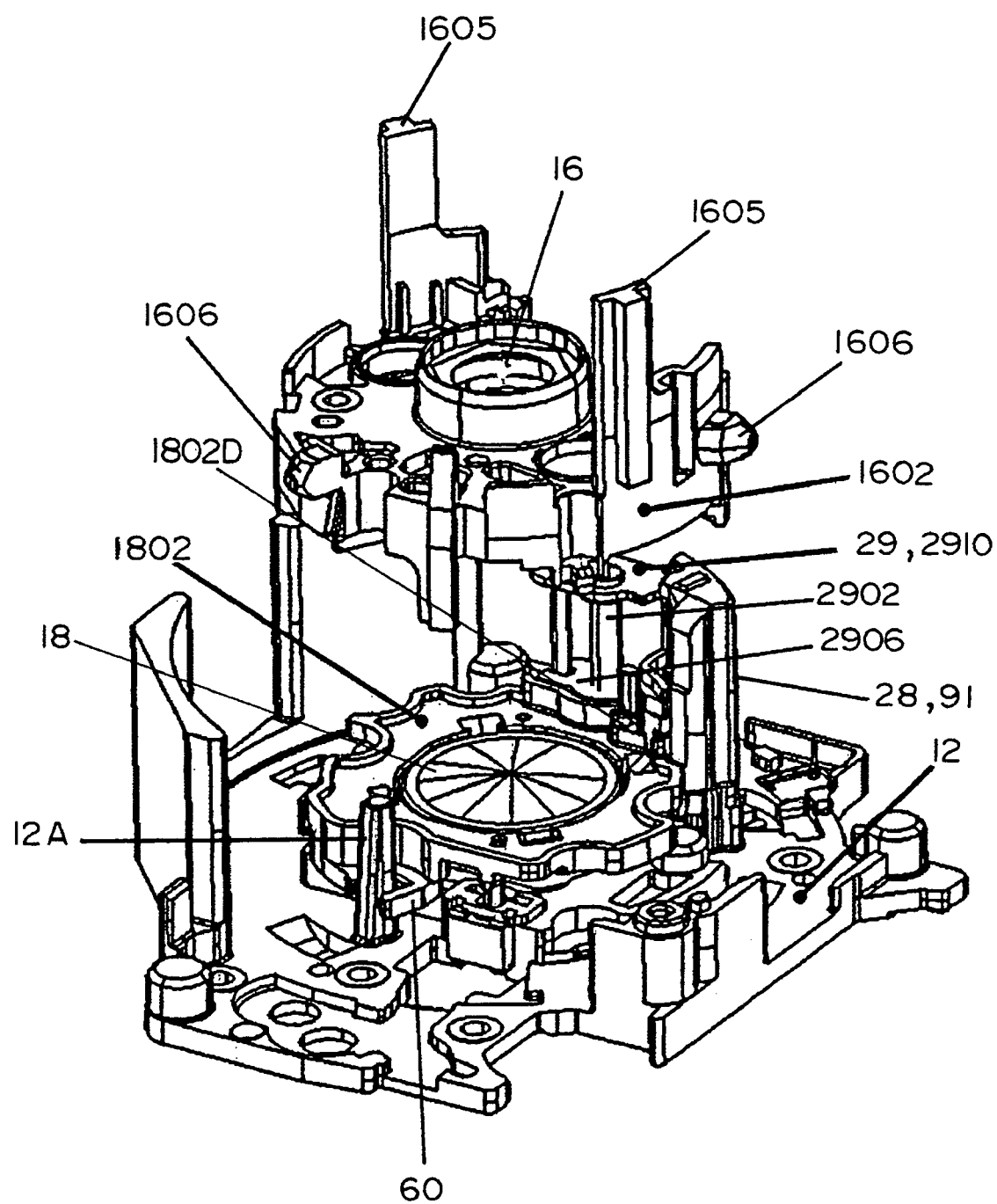
FIG. 9 is a perspective view illustrating the configuration of each of a second lens holding frame 1602, the third group lens holding frame 1802, and the base 12.
Figure 10:
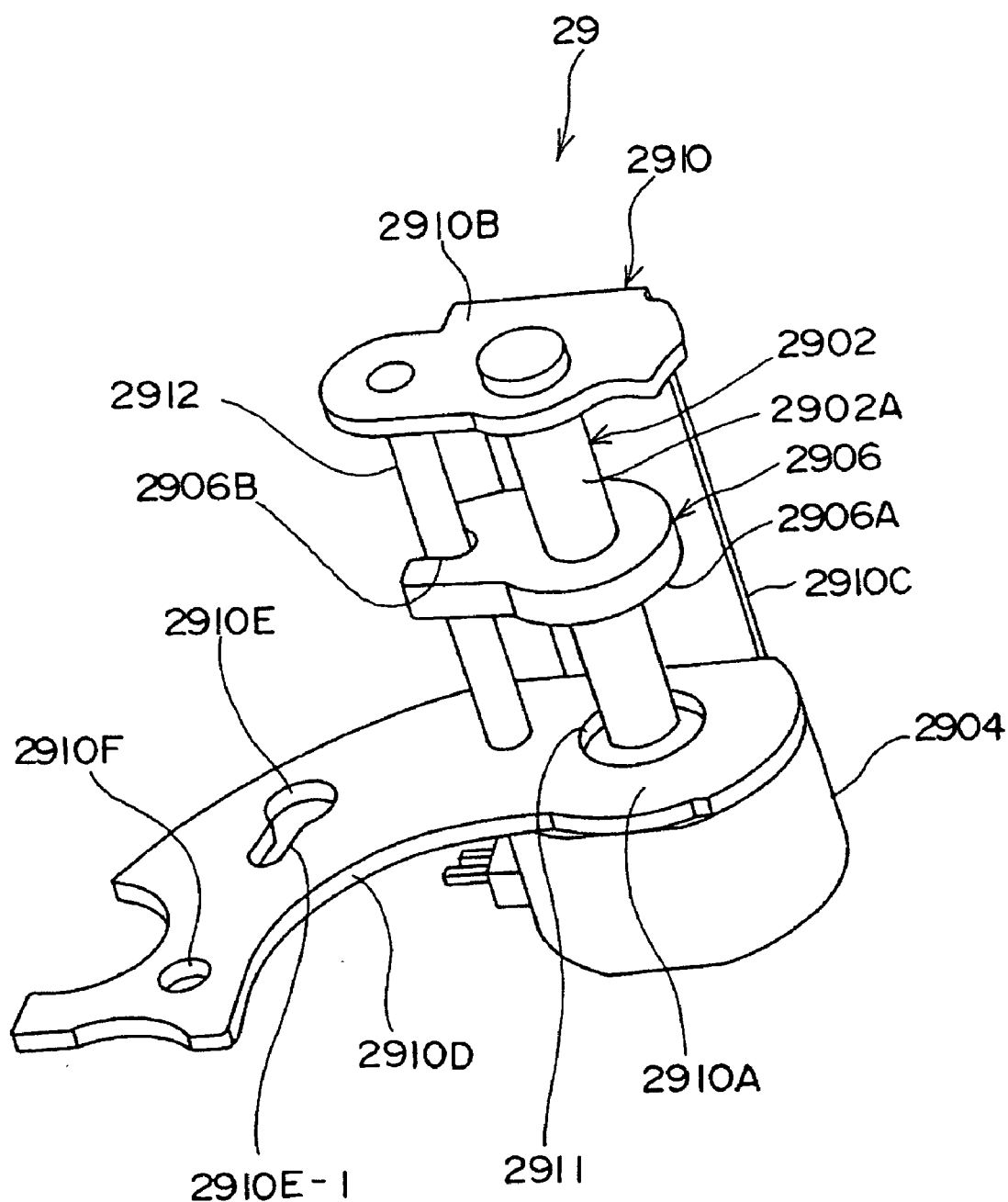
FIG. 10 is a perspective view illustrating the configuration of a drive mechanism 29.
Figure 11:
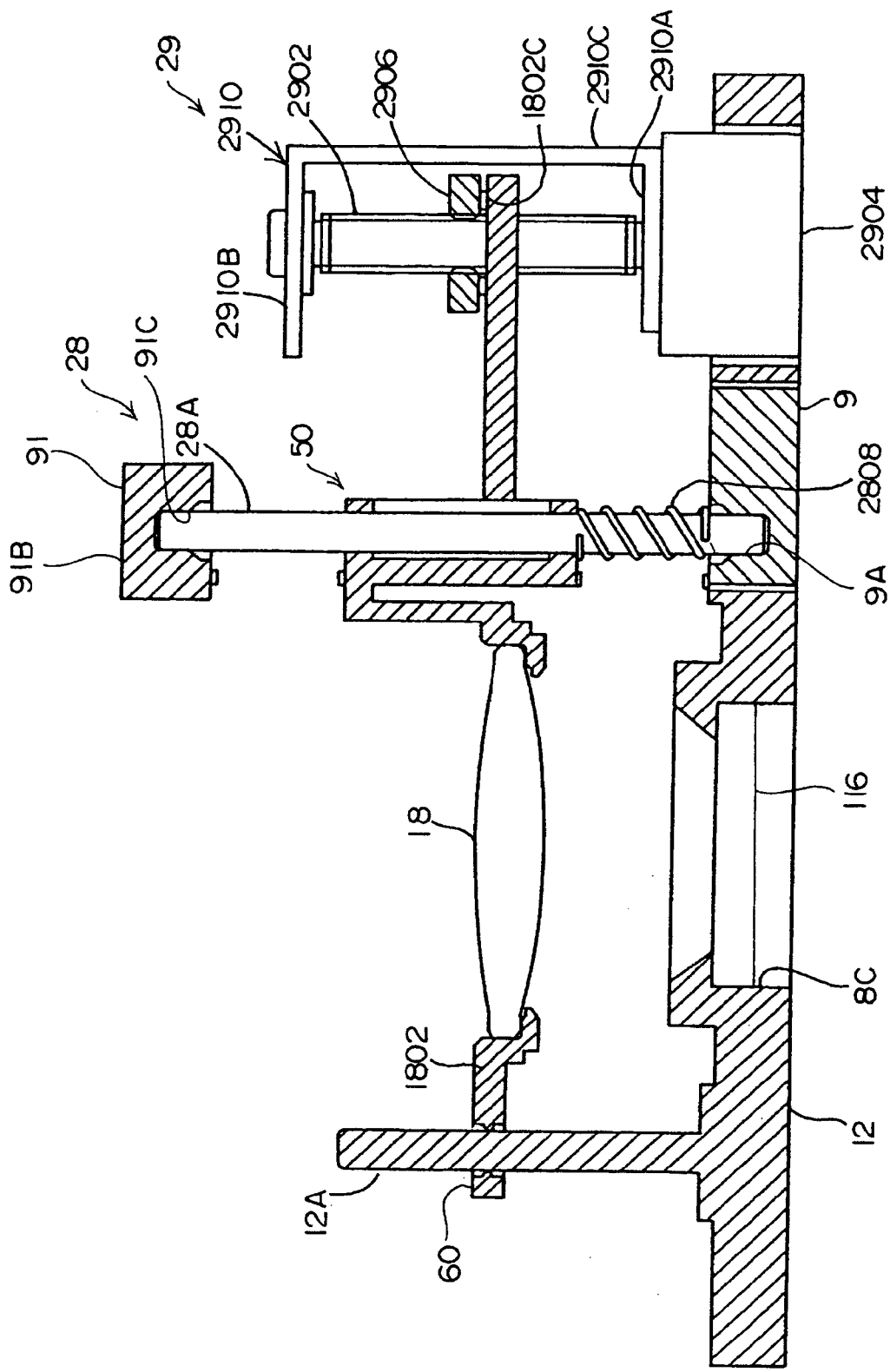
FIG. 11 is an explanatory view illustrating the configuration of each of the third group lens holding frame 1802 and the base 12.
Figure 12A:
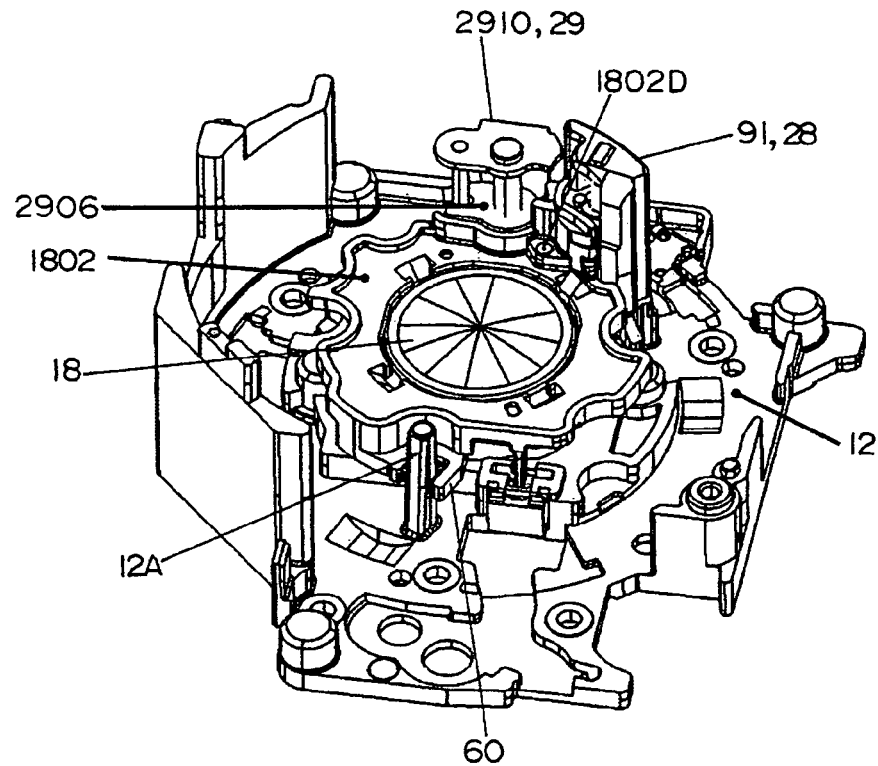
FIGS. 12(A) and 12(B) are perspective views illustrating a condition in which the third group lens holding frame 1802 is moved to a rear position.
Figure 12B:
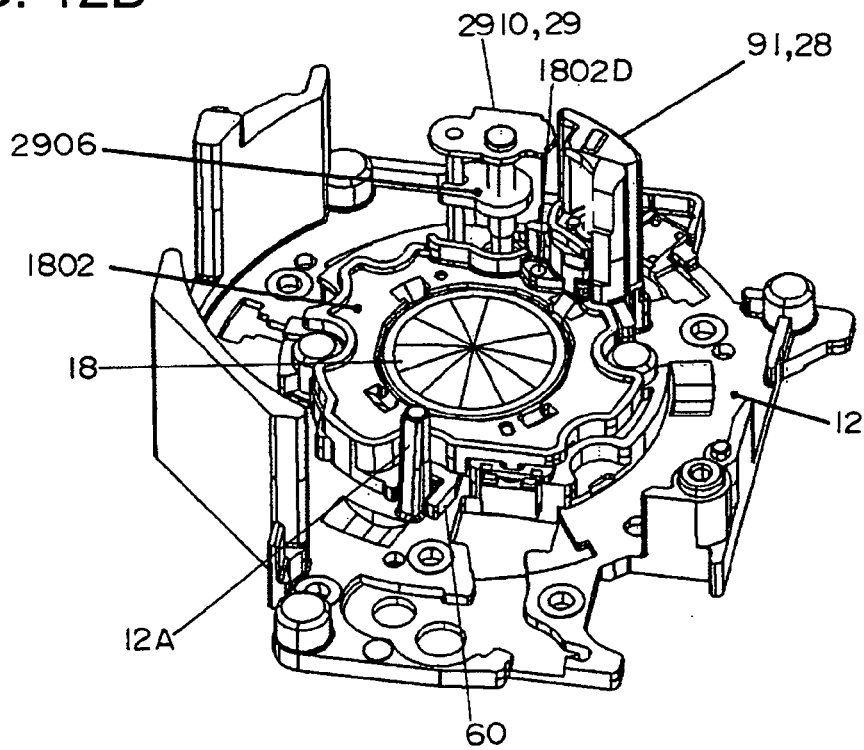

FIG. 8 is a perspective view illustrating the configuration of each of the third group lens holding frame 1802 and the base 12. FIG. 9 is a perspective view illustrating the configuration of each of the second lens holding frame 1602, the third group lens holding frame 1802, and the base 12. FIG. 10 is a perspective view illustrating the configuration of the drive mechanism 29. FIG. 11 is an explanatory view illustrating the configuration of each of the third group lens holding frame 1802 and the base 12. FIG. 12(A) is a perspective views illustrating a condition in which the third group lens holding frame 1802 is moved to a rear position. FIG. 12(B) is a perspective views illustrating a condition in which the third group lens holding frame 1802 is moved to a more rear position.

As shown in FIGS. 8 and 9, the third group lens holding frame 1802 is formed like an annular plate, and holds the third group lens in the central opening thereof.

As shown in FIG. 11, an engaging piece 1802C is provided in such a way as to protrude radially outwardly from the outer periphery of the third group lens holding frame 1802.

Further, a first bearing portion 50 and a second bearing portion 60 are disposed at places spaced in the circumferential direction in the radially outer portions of the third group lens holding frame 1802.

Guide shafts 28A and 12A extending along the direction of the optical axis are passed through the first bearing portion 50 and the second bearing portion 60, respectively. The guide shafts 28A and 12A are formed like, for example, a column having a uniform outside diameter, and attached to the base 12.

The guide mechanism 28 for guiding the third group lens holding frame 1802, in other words, the movable lens, in such a way as to reciprocally and rectilinearly move the lens is constituted by the guide shafts 28A and 12A and the first bearing portion 50 and the second bearing portion 60.

Concretely, as shown in FIG. 11, the attachment of the guide shaft 28A to the base 12 is performed by supporting both the front end and the rear end of the guide shaft 28A through the use of a guide shaft supporting wall 91 and a guide shaft pressing member 9. In other words, both ends of the guide shaft 28A are supported by the lens barrel 10.

The guide shaft supporting wall 91 is provided integrally with the base 12 by, for instance, die-forming.

The guide shaft supporting wall 91 is constituted by two extension sections 91A frontward extending along the optical axis from a portion of the base 12, which faces the front face of the imaging device 116, and an end section 91B for connecting the ends of the extension sections 91A. The end section 91B faces the base 12. Further, the two extension sections 91A are provided at two places in such a way as to put the guide shaft 28A therebetween along the circumferential direction.

A concave portion 91C for holding the front end of the guide shaft 28A is provided at the end section 91B, in other words, the front end of the guide shaft supporting wall 91. The concave portion 91C is formed like a bottom cylindrical hole, into which the end of the guide shaft 28A is inserted. This bottomed hole has a D-shaped cross-section, for example.

A hole portion is provided in the front portion of the base 12, which faces the guide shaft supporting wall 91. The guide shaft pressing member 9 is mounted in the hole portion. The guide shaft pressing member 9 is provided with a fitting hole 9A for holding the rear end of the guide shaft 28A. This fitting hole 9A has, for instance, a D-shaped cross-section.

When the guide shaft 28A is in a state in which the front end thereof is inserted into the concave portion 91C, and the rear end thereof is fitted into and fixed to the fitting hole 9A, the guide shaft pressing member 9s is moved in a direction perpendicular to a direction, in which the guide shaft 28A extends. Thus, the position thereof is adjusted so that the optical axis of the third group lens 18 is parallel to those of the first group lens and the second group lens. During such a state, the guide shaft pressing member 9 and the base 12 are bonded and fixed to each other by an adhesive agent.

The drive mechanism 29 is operative to move the third group lens holding frame 1802 in the direction of the optical axis, as shown in FIGS. 10 and 11. The drive mechanism 29 has a male screw member 2902 extending along the direction of the optical axis, a motor 2904 constituted by a stepping motor for turning the male screw member 2902, a female screw member 2906 (which may be referred to from time to time as the moving piece)) to be screwed to the male screw member 2902, the engaging piece 1802C of the third group lens holding frame 1802, and a coil spring 2908. A metallic material is used as the material of the male screw member 2902 and the female screw member 2906.

As shown in FIG. 10, the motor 2904 is attached to a motor disposing member 2910. The male screw member 2902 is connected to the motor 2904 and extends in a direction parallel to the direction of the optical axis of the third group lens 18.

The motor disposing member 2910 has a first supporting piece 2910A that is to be attached to the end face of the case of the motor 2904, a second supporting piece 2910B facing the first supporting piece 2910A, and a third supporting piece 2910C connecting the first supporting piece 2910A and the second supporting piece 2910B to each other.

The first supporting piece 2910A is provided with a projecting portion 2910D formed in such a way as to project along a face perpendicular to the direction in which the male screw member 2902 extends. A screw insertion hole 2910E and a positioning hole 2910F are formed in this projecting portion 2910D. In a state in which the positioning hole 2910F is engaged with the boss of the base 12, as shown in FIG. 8, a screw 202 is screwed into a screw hole provided in the base 12 from the hole 2910E, so that the motor disposing member 2910 is attached to the base 12. Incidentally, an engaging groove 2910E-1 is formed in a radially outward portion of the screw insertion hole 2910E. The engaging groove 2910E-1 is engaged with a protruding portion provided at the side of the base 12. This prevents the motor disposing member 2910 from swinging around the hole 2910E.

As shown in FIG. 10, the third supporting piece 2910C extends from the base end of the first supporting piece 2910A. The second supporting piece 2910B is provided at an end of the third supporting piece 2910C.

The end of the male screw member 2902 (in other words, the front end in the direction of the optical axis of the third group lens 18) is rotatably supported through a bearing hole of the second supporting piece 2910B.

A rod 2912 for whirl-stop is mounted between the first supporting piece 2910A and the second supporting piece 2910B of the motor disposing member 2910 in such a manner so as to be spaced from the male screw member 2902 and to extend nearly in parallel thereto.

The female screw member 2906 is screwed into the male screw member 2902. An engaging concave portion 2906B of the female screw member 2906 engages with the rod 2912 to thereby block the rotation of the female screw member 2906. The female screw member 2906 is reciprocally moved along the longitudinal direction of the male screw member 2902 by the normal rotation and the reverse rotation of the male screw member 2902.

An end portion 2906A of the female screw member 2906, which faces the rear in the direction of the optical axis of the third group lens 18, is provided in such a way as to abut against an engaging portion 1802B, which is a portion of the outer periphery of the third group lens holding frame 1802.

The male screw member 2902 has a male screw portion 2902A that is to be screwed into the female screw member 2906, as shown in FIGS. 10 and 11. The female screw member 2906 is disposed in such a manner as to move along the male screw member 2902 over the entire length in the direction in which the male screw portion 2902A thereof extends.

The coil spring 2908 is provided by being wound around the guide shaft 28A so that an end of the coil spring 2908 is locked in the third group lens holding frame 1802, while the other end thereof is locked in the base side 12 (in other words, the guide shaft pressing member 9). The third group lens holding frame 1802 is pushed in a direction in which the engaging portion 1802C is caused to abut against the end portion 2906A of the female screw member 2906. In other words, the coil spring 2908 pushes the third group lens holding frame 1802 frontward in the direction of the optical axis to thereby cause the engaging portion 1802C of the third group lens holding frame 1802 to always abut against the female screw member 2906. Thus, the third group lens holding frame 1802, in other words, the third group lens 18, reciprocally and rectilinearly moves by following the motion of the female screw member 2906.

Therefore, in a case where it is assumed that the normal rotation of the motor 2904 causes the third group lens 18 (thus, the third group lens holding frame 1802) to frontward move in the direction of the optical axis and the reverse rotation thereof causes the third group lens 18 to backwardly move in the direction of the optical axis, the female screw member 2906 is moved frontward in response to the normal rotation of the male screw member 2902. Consequently, the third group lens 18 (in other words, the third group lens holding frame 1802) is moved frontward in the direction of the optical axis. The normal rotation and the reverse rotation of the motor 2904 causes the female screw member 2906 to move reciprocally and rectilinearly in the direction of the optical axis on the male screw portion 2902A. Consequently, the third group lens 18 is moved in the direction of the optical axis.

Figure 13:
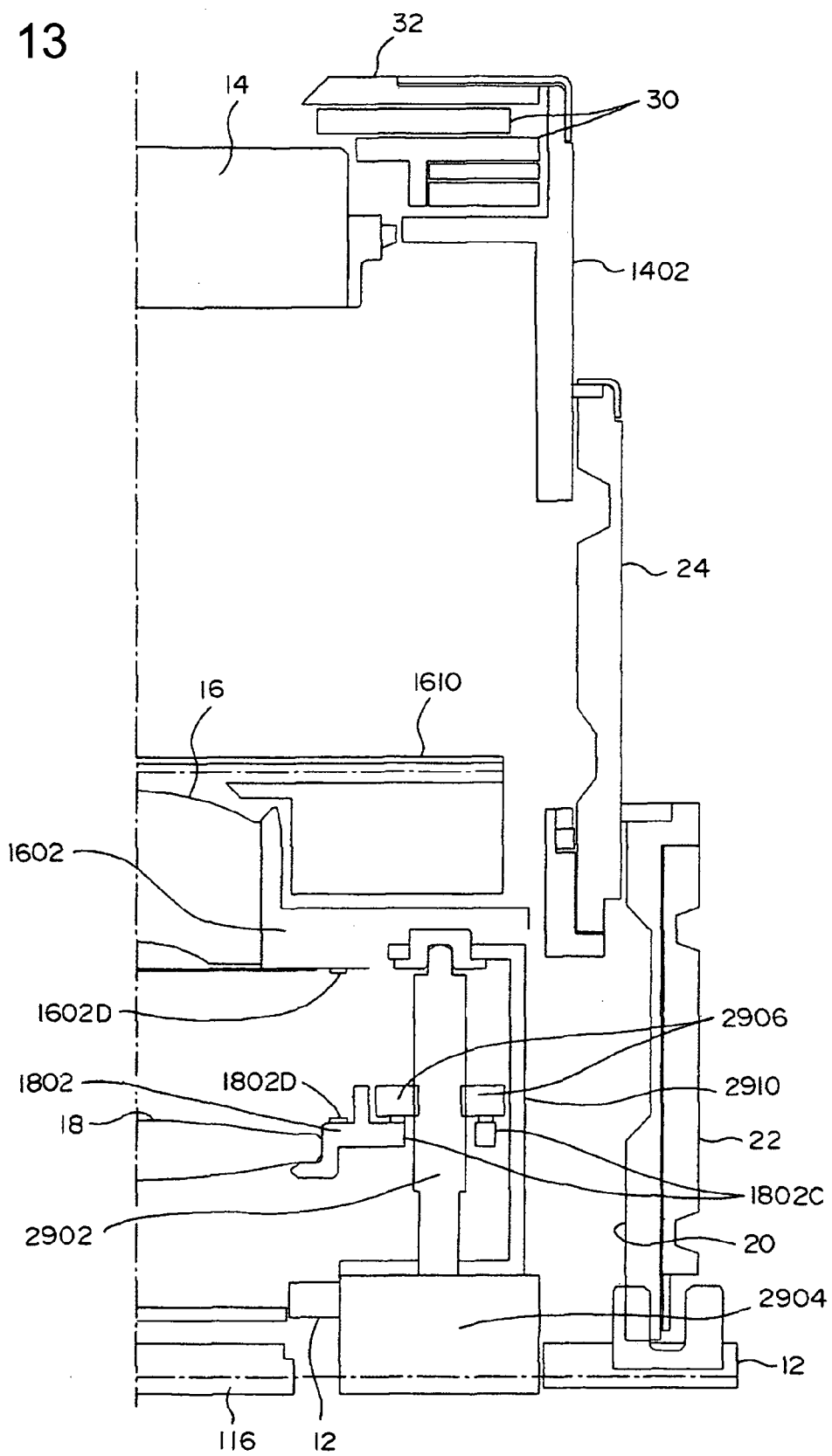
FIG. 13 is a longitudinal cross-section view of a lens barrel 10 in a used condition.

In this example of preferred the embodiment, as shown in FIG. 13, among the first group lens holding frame 1402, the second group lens holding frame 1602, and the third group lens holding frame 1802, the third group lens frame 1802 is placed at the rearmost position. The second group lens holding frame 1602 is placed immediately in front of the third group lens holding frame 1802.

As shown in FIGS. 9, 12, and 13, in this example of preferred embodiment in the vicinity of the first bearing portion 50 at the front portion of the third group lens holding frame 1802, at an intermediate position between the first bearing portion 50 and the engaging piece 1802C, an abutting portion 1802D is provided in such away as to frontward project. An end of the abutting portion 1602D constitutes a flat face perpendicular to the optical axis.

Further, as shown in FIG. 13, in the rear portion of the second group lens holding frame 1602, the abutting portion 1602D, which can abut against the abutting portion 1802D of the third group lens holding frame 1802, is provided at a place corresponding to the abutting portion 1802D thereof in such a way as to frontward project therefrom. An end of the abutting portion 1602D constitutes a flat face perpendicular to the optical axis.

Figure 14:
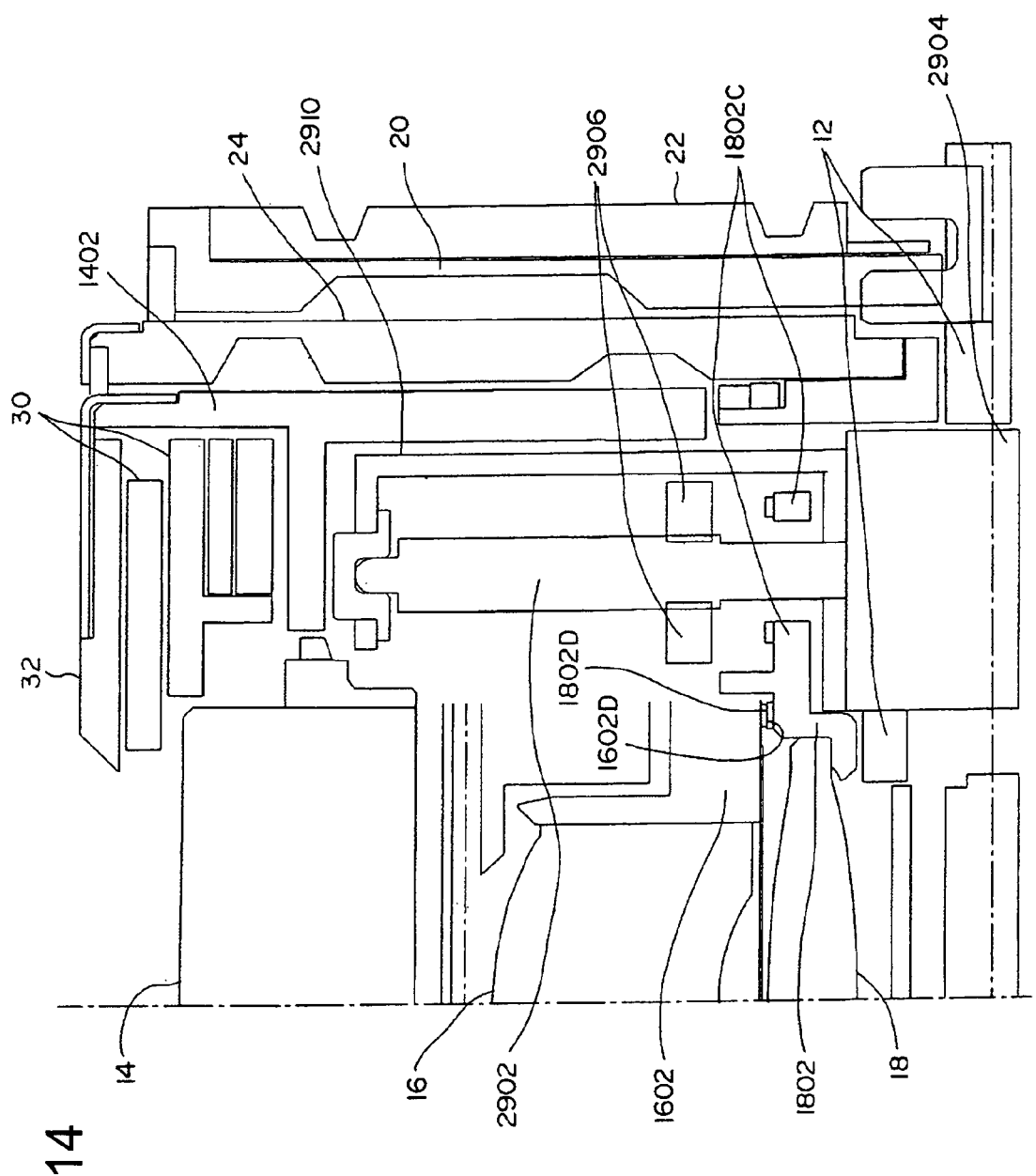
FIG. 14 is a longitudinal cross-section view of the lens barrel 10 in a collapsed condition.

Furthermore, this example of preferred embodiment is configured so that a clearance is assured between the rear surface of the lens, which is disposed at the rearmost position among those of the second group lens 16, and the front face of the lens, which is disposed at the frontmost position among those of the third group lens 1802, in a state in which the abutting portion 1602D of the second group lens holding frame 1602 abuts against the abutting portion 1802D of the third group lens holding frame 1802, as shown in FIG. 14.

Next, an operation of the barrel 10 is described hereinbelow.

FIG. 13 is a longitudinal cross-section view of the barrel 10 in a used condition. FIG. 14 is a longitudinal cross-section view of the barrel 10 in a collapsed condition.

First, the used condition is described hereunder. As shown in FIG. 13, the rotating ring 22 is rotation-driven by the rotating ring drive mechanism 23. Thus, the cam ring 24 and the first group lens holding frame 1402 are frontward projected from the case 102. In other words, the first barrel 10A and the second barrel 10B are brought into the used condition in which the first barrel 10A and the second barrel 10B are most frontward projected therefrom.

A zooming operation is performed by moving the second group lens holding frame 1602 frontward and rearward along the direction of the optical axis through the use of the drive mechanism for the second group lens holding frame 1602. A focusing operation is performed by moving the third group lens holding frame 1802 frontward and rearward along the direction of the optical axis through the use of the drive mechanism 29 for the third group lens holding frame 1802.

Next, the collapsed condition is described hereinbelow.

First, regarding the barrel 10, as shown in FIG. 14, the rotating ring 22 is rotation-driven by the rotating ring drive mechanism 23. Thus, the cam ring 24 and the first group lens holding frame 1402 retreat and are accommodated in the case 102. Consequently, the barrel 10 is put into a collapsed condition in which the total length of the first barrel 10A, the second barrel 10B, and the third barrel 10C is minimum.

Next, regarding the lens holding frame, when the state thereof is changed from the used condition to the collapsed condition, the third group lens holding frame 1802 is retreated by the drive mechanism 29 to a predetermined rear position, in other words, to the rear end position that is the rearmost position. Then, the second group lens holding frame 1602 is rearward moved by the drive mechanism therefor and made to abut against the third group lens holding frame 1802 that is placed at the rear end position. Subsequently, the second group lens holding frame 1602 is more rearward moved to the rear end position of the second group lens holding frame 1602 that is moved to the rearmost position. Therefore, the third group lens holding frame 1802, together with the second group lens holding frame 1602, is more backwardly moved, by the drive mechanism 29 from the rear end position to which the third group lens holding frame 1802 has been moved by the drive mechanism 29. At the rear end position of the second group lens holding frame 1602, to which the second group lens holding frame 1602 is most backwardly moved by the drive mechanism therefor, the coil spring 2808 is compressed, so that the female screw member 2906 is separated from the engaging piece 1802C. Further, the first group lens holding frame 1402 is retreated to the rear end position at which the predetermined clearance between the first group lens holding frame 1402 and the second group lens holding frame 1602 placed at the rear end position is maintained.

Thus, in the collapsed condition, a clearance is ensured among the third group lens holding frame 1802, the base 12 and a member attached to the base 12, in other words, the member attached to the inner rear end of the barrel 10.

According to this example of the preferred embodiment, in the collapsed condition of the barrel 10, it is sufficient to ensure that clearances are provided at two places, in other words, a clearance between the first group lens holding frame 1402 and the second group lens holding frame 1602, and a clearance between the third group lens holding frame 1802 and the member attached to the inner rear end of the barrel 10. Thus, as compared with the conventional case where clearances are provided at three places, in other words, the clearance between the first group lens holding frame 1402 and the second group lens holding frame 1602, the clearance between the second group lens holding frame 1602 and the third group lens holding frame 1802, and the clearance between the third group lens holding frame 1802 and the member attached to the inner rear end of the barrel 10 should be ensured, the assurance of a clearance at one of the places can be omitted. Consequently, the size in the direction of the optical axis of the barrel 10 can be reduced.

Further, when the second group lens holding frame 1602 is made to abut against the third group lens holding frame 1802, the coil spring 2808 for pushing the third group lens holding frame 1802 in a direction in which the third group lens holding frame 1802 abuts against the female screw member 2906, is utilized and compressed. Thus, the second group lens holding frame 1602 can be made to abut against the third group lens holding frame 1802, without increasing the number of components, and without damaging the drive mechanism for the second group lens holding frame 1602 and the drive mechanism 29 for the third group lens holding frame 1802.

Further, in the collapsed condition, the female screw member 2906 of the drive mechanism 29 is separated from the engaging piece 1802C of the third group lens holding frame 1802. Thus, it is unnecessary to precisely control the rear end position of the third group lens holding frame 1802. Therefore, it is also unnecessary for the drive mechanism 29 to exactly control the amount of movement of the third group lens holding frame 1802 placed at the rear end position thereof. Consequently, this example of the preferred embodiment is advantageous in that it may simplify the controlling operation.

Additionally, in this example of the preferred embodiment, the place, at which the second group lens holding frame 1602 abuts against the third group lens holding frame 1802, is positioned in the vicinity of the portion through which the guide shaft 2808 penetrates. Thus, a prizing force can be prevented from being generated between the first bearing portion 50 of the third group lens holding frame 1802 and the guide shaft 2808 when the third group lens holding frame 1802 is retreated after the second group lens holding frame 1602 abuts against the third group lens holding frame 1802. Thus, this example of the preferred embodiment is advantageous in smoothly retreating the third group lens holding frame 1802.

By the way, although the description of this example of the preferred embodiment has described a digital still camera employed as the imaging apparatus, the present invention can be applied to various kinds of imaging apparatuses, such as a video camera. Therefore, while the preferred embodiments of the present invention have been described with reference to the attached drawings, it is to be understood that the present invention is not limited to the embodiments described above. It will be obvious to those of ordinary skill in the art that various changes, modifications, combinations, sub-combinations, alterations and the like may be made depending on design requirements and other factors insofar as they are within the scope of the appended claims and equivalents thereof.

What is claimed is:

1. A collapsible lens barrel including plural barrels of different outside diameters from one another and enabled to move coaxially and perform relative movement in an axial direction, and an image-capturing optical system disposed within the plural barrels; wherein the image-capturing optical system includes at least two lens holding frames arranged in a direction of an optical axis of the image-capturing optical system; and, considering an object side is set as a front side and an opposite side is set as a rear side, each of a rearmost lens holding frame, placed at a rearmost position, and one of the lens holding frames placed immediately in front of the rearmost lens holding frame, are respectively movably supported by a corresponding guide mechanism to move in the direction of the optical axis and to move in the direction of the optical axis by a corresponding drive mechanism, the collapsible lens barrel comprising:

a drive mechanism for moving the rearmost lens holding frame in the direction of the optical axis and including a moving piece driven by a motor to move rectilinearly along the direction of the optical axis; wherein:

the rearmost lens holding frame is pushed forwardly by a coil spring;

an engaging piece provided in the rearmost lens holding frame is abutted against the moving piece from behind the moving piece and follows a rectilinear movement of the moving piece so as to move the rearmost lens holding frame in the direction of the optical axis;

the rearmost lens holding frame is moved by the corresponding drive mechanism to a rear end position, which is located most backwardly, in a collapsed status in which a total length of the plural barrels is minimum; and the lens holding frame placed immediately in front of the rearmost lens holding frame is backwardly moved by the corresponding drive mechanism and abuts against the rearmost lens holding frame placed at the rear end position, to then move backwardly together with the rearmost lens holding frame to a rear end place at which the moving piece is separated from the engaging piece.

2. The collapsible lens barrel according to claim 1, wherein:

the guide mechanism for movably supporting the rearmost lens holding frame to move the rearmost lens holding frame in the direction of the optical axis has a guide shaft extending in the direction of the optical axis and penetrating through the rearmost lens holding frame; and a place at which the lens holding frame placed immediately in front of the rearmost lens holding frame abuts against the rearmost lens holding frame is located in the vicinity of a portion through which the guide shaft penetrates.

3. The collapsible lens barrel according to claim 1, wherein:

the guide mechanism for movably supporting the rearmost lens holding frame to move the rearmost lens holding frame in the direction of the optical axis has a guide shaft extending in the direction of the optical axis and penetrating through the rearmost lens holding frame; and a place at which the lens holding frame placed immediately in front of the rearmost lens holding frame abuts against the rearmost lens holding frame is located in the vicinity of a portion through which the guide shaft penetrates;

the coil spring is wound around the guide shaft;

a front end of the coil spring is locked in the lens holding frame; and a rear end of the coil spring is locked in a rear end side in the barrel.

4. The collapsible lens barrel according to claim 1, wherein:

the drive mechanism for moving the rearmost lens holding frame in the direction of the optical axis includes a male screw member extending along the direction of the optical axis and rotated by the motor, and a female screw member having its rotation blocked and screwed onto the male screw member, and caused to move along the male screw member due to rotation of the male screw member; and the moving piece is constituted by the male screw member.

5. The collapsible lens barrel according to claim 1, wherein:

in a collapsed condition, in which a total length of the plural barrels is minimum, a clearance is ensured between the rearmost lens holding frame and a member attached to an inner rear end of the barrel.

6. An imaging apparatus including plural barrels of different outside diameters from one another and enabled to move coaxially and perform relative movement in an axial direction, and an image-capturing optical system disposed within the plural barrels; wherein the image-capturing optical system includes at least two lens holding frames arranged in a direction of an optical axis of the image-capturing optical system; and, considering an object side is set as a front side and an opposite side is set as a rear side, each of a rearmost lens holding frame, placed at a rearmost position, and one of the lens holding frames placed immediately in front of the rearmost lens holding frame, are respectively movably supported by a corresponding guide mechanism to move in the direction of the optical axis and to move in the direction of the optical axis by a corresponding drive mechanism, the imaging apparatus comprising:

a drive mechanism for moving the rearmost lens holding frame in the direction of the optical axis and including a moving piece driven by a motor to move rectilinearly along the direction of the optical axis; wherein:

the rearmost lens holding frame is pushed forwardly by a coil spring;

an engaging piece provided in the rearmost lens holding frame is abutted against the moving piece from behind the moving piece and follows a rectilinear movement of the moving piece so as to move the rearmost lens holding frame in the direction of the optical axis;

the rearmost lens holding frame is moved by the corresponding drive mechanism to a rear end position, which is located most backwardly, in a collapsed status in which a total length of the plural barrels is minimum; and the lens holding frame placed immediately in front of the rearmost lens holding frame is backwardly moved by the corresponding drive mechanism and abuts against the rearmost lens holding frame placed at the rear end position, to then move backwardly together with the rearmost lens holding frame to a rear end place at which the moving piece is separated from the engaging piece.

7. The imaging apparatus according to claim 6, wherein:

the guide mechanism for movably supporting the rearmost lens holding frame to move the rearmost lens holding frame in the direction of the optical axis has a guide shaft extending in the direction of the optical axis and penetrating through the rearmost lens holding frame; and a place at which the lens holding frame placed immediately in front of the rearmost lens holding frame abuts against the rearmost lens holding frame is located in the vicinity of a portion through which the guide shaft penetrates.

8. The imaging apparatus according to claim 6, wherein:

the guide mechanism for movably supporting the rearmost lens holding frame to move the rearmost lens holding frame in the direction of the optical axis has a guide shaft extending in the direction of the optical axis and penetrating through the rearmost lens holding frame; and a place at which the lens holding frame placed immediately in front of the rearmost lens holding frame abuts against the rearmost lens holding frame is located in the vicinity of a portion through which the guide shaft penetrates;

the coil spring is wound around the guide shaft;

a front end of the coil spring is locked in the lens holding frame; and a rear end of the coil spring is locked in a rear end side in the barrel.

9. The imaging apparatus according to claim 6, wherein:

the drive mechanism for moving the rearmost lens holding frame in the direction of the optical axis includes a male screw member extending along the direction of the optical axis and rotated by the motor, and a female screw member having its rotation blocked and screwed onto the male screw member, and caused to move along the male screw member due to rotation of the male screw member; and the moving piece is constituted by the male screw member.

10. The imaging apparatus according to claim 6, wherein:

in a collapsed condition, in which a total length of the plural barrels is minimum, a clearance is ensured between the rearmost lens holding frame and a member attached to an inner rear end of the barrel.

* * * * *